United States Patent [19]

Komada

[11] Patent Number: 5,121,890
[45] Date of Patent: Jun. 16, 1992

[54] DISPLAY STAND

[76] Inventor: Hitoshi Komada, 28-3 Aza Shimoiseji, Oaza Saito, Fuso-cho, Niwa-Gun, Aichi-Ken, Japan

[21] Appl. No.: 707,702

[22] Filed: May 30, 1991

[51] Int. Cl.$^5$ .................................................. F16L 3/00
[52] U.S. Cl. ........................................ 248/122; 248/167; 248/434
[58] Field of Search .............. 248/167, 170, 165, 166, 248/168, 169, 434, 435, 172, 173, 122, 188.6, 125, 124; 84/327, 387 A

[56] References Cited

U.S. PATENT DOCUMENTS

| | | | |
|---|---|---|---|
| 898,374 | 9/1908 | Jessen | 248/397 |
| 1,837,637 | 12/1931 | Walberg | 248/171 X |
| 2,464,031 | 3/1949 | Fiedel | 248/167 |
| 2,547,924 | 4/1951 | Citro | 84/327 |
| 3,009,275 | 11/1961 | Rosenberg | 248/490 |
| 3,173,642 | 3/1965 | Greenspan | 248/170 |
| 4,099,441 | 7/1978 | Landon | 84/327 |
| 4,742,751 | 5/1988 | Cherry | 84/327 |
| 4,943,021 | 7/1990 | Cien | 84/327 X |

FOREIGN PATENT DOCUMENTS 169300 4/1906 Fed. Rep. of Germany ...... 248/490

Primary Examiner—J. Franklin Foss
Attorney, Agent, or Firm—Fitch, Even, Tabin & Flannery

[57] ABSTRACT

A display stand including a base, a post disposed on the base, a pair of arms pivotally coupled to the post and each having an upper rod fixed to an outer end, two springs biasing the arms upward, a pair of links having an upper end pivotally coupled to the outer ends of the arms and having a lower end pivotally coupled together, a lower rod coupled to the lower ends of the links, whereby the arms will be caused to rotate downward when an object is disposed on the lower rod so that the upper rods will be caused to move toward the object in order to hold the object in place.

6 Claims, 7 Drawing Sheets

DISPLAY STAND

BACKGROUND OF THE INVENTION

1. Field of the Invention

The present invention relates to a stand, and more particularly to a display stand for an object.

2. Description of the Prior Art

Objects, especially guitars are generally directly displayed on a table or a stand of fixed configuration. The objects can not be stably held in place.

The present invention has arisen to provide a novel display stand for stably holding objects.

SUMMARY OF THE INVENTION

The primary objective of the present invention is to provide a display stand for stably supporting and holding objects in place.

In accordance with one aspect of the invention, there is provided a display stand which includes a base, a post vertically disposed on the base, a pair of arms each having an inner end pivotally coupled to an upper end of the post at a pivot axle and each having a first rod perpendicularly fixed to an outer end thereof, a spring disposed on each of the pivot axles for biasing the arms upward, a pair of links each having an upper end pivotally coupled to the outer end of a respective arm and having a lower end pivotally coupled together, a second rod perpendicularly coupled to the lower end of the links whereby, the arms will be caused to rotate downward when an object is disposed on the second rod so that the first rods will be caused to move toward the object in order to hold the object in place.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
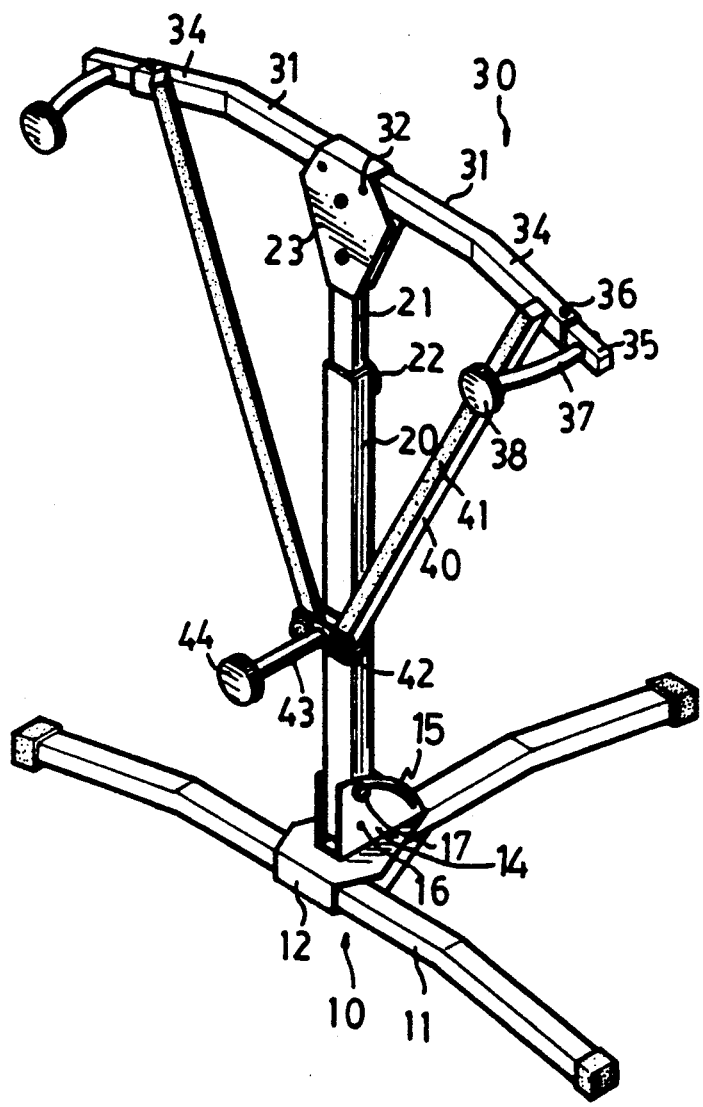
FIG. 1 is a perspective view of a display stand in accordance with the present invention.
Figure 2:
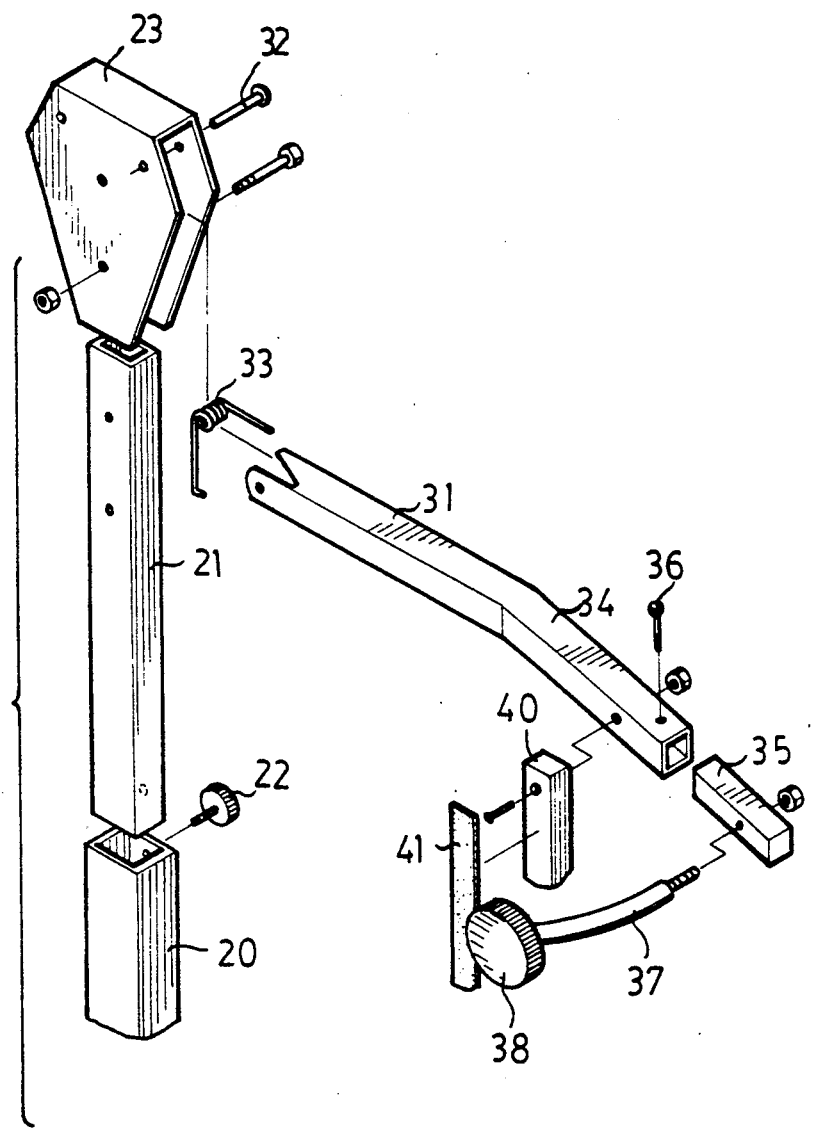
FIG. 2 is a partial exploded view of the display stand.

Referring to the drawings and initially to FIGS. 1 and 2, a display stand in accordance with the present invention comprises generally a base portion 10, a post 20 vertically disposed on the base portion 10, and a supporting means 30 coupled to the post 20 for supporting an object, such as a guitar.

The base portion 10 includes three legs 11 coupled together at a coupler 12 on which a U-shaped bracket 14 is disposed. A curved slot 15 is formed in one of the walls of the bracket 14. The lower end of the post 20 is pivotally coupled between the walls of the bracket 14 by a pin 16. A fixing bolt 17 extends through the slot 15 and is threadedly engaged to the lower end portion of the post 20. The post 20 is rotatable about the pin 16 and can be fixed in any desired angle by the fixing bolt 17. A bar 21 is slidably engaged in the post 20 and extendible upward beyond the post 20 and can be fixed in place by a fixing bolt 22. A coupler 23 is fixed on the upper end of the bar 21.

Figure 3:
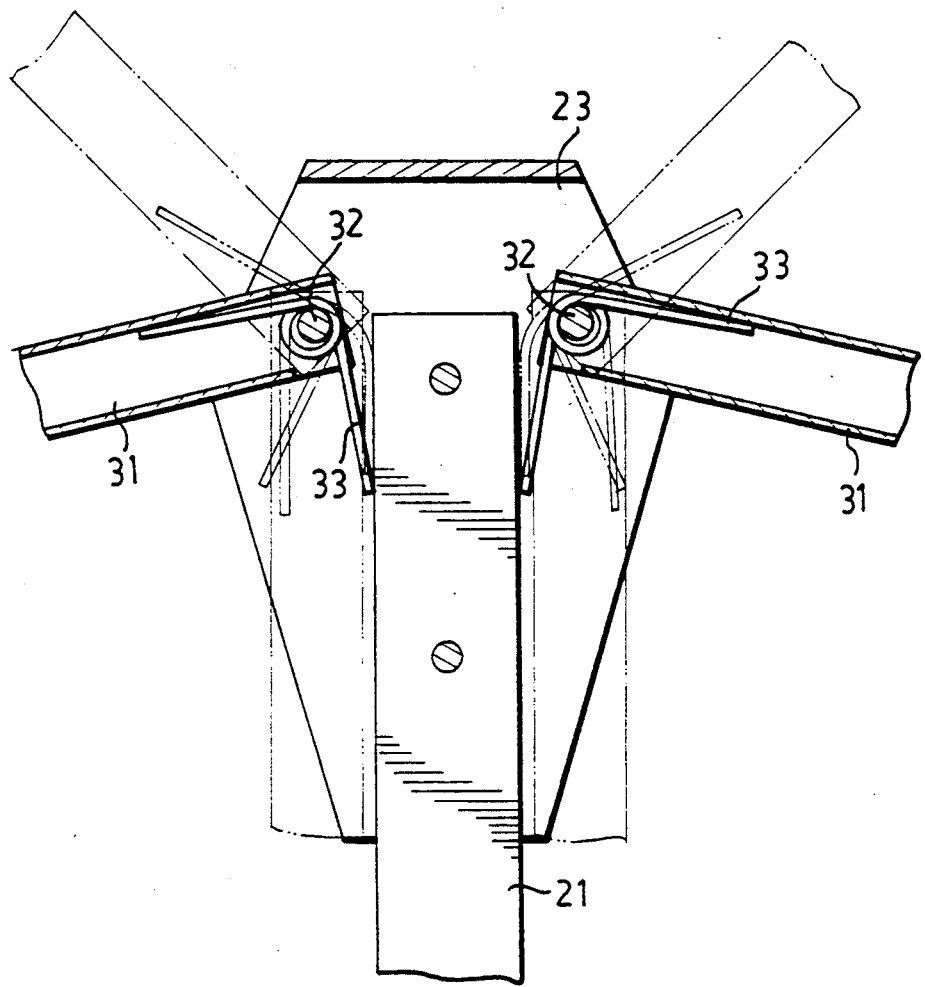
FIG. 3 is a schematic view illustrating a coupling of the display stand.
Figure 4:
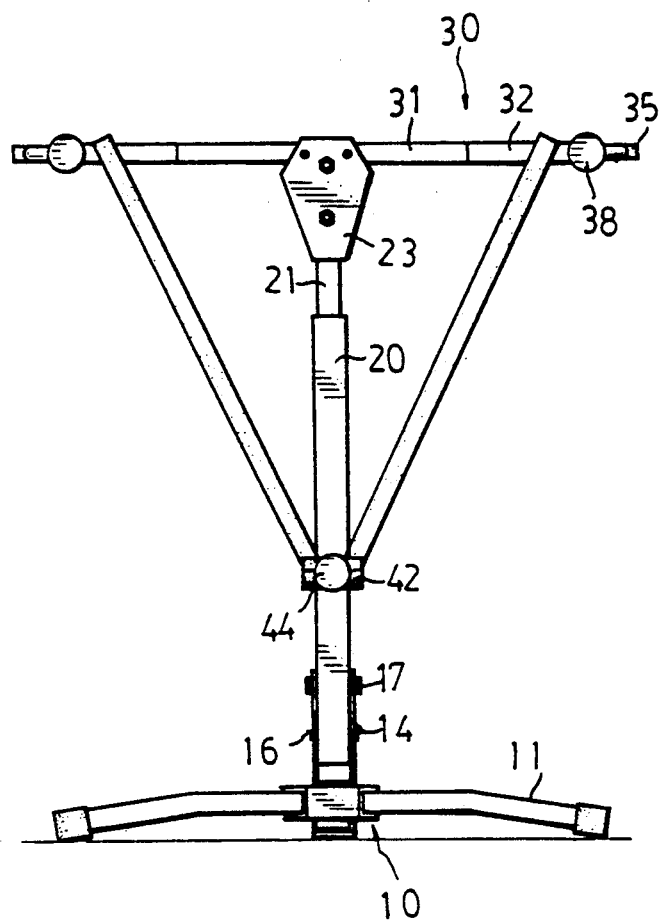
FIG. 4 is a front view of the display stand.

The supporting means 30 includes a pair of arms 31 each having an inner end pivotally coupled to the coupler 23 at a pivot axle 32. A spring 33 is disposed on each of the axles 32 for biasing the arms 31 so that the arms 31 are resiliently supported by the springs 33, as shown in FIG. 3 and can be supported in the position as shown in FIG. 4 when no objects are disposed thereon. It is preferably that each of the arms 31 has a forwardly bent portion 34 formed on the outer end thereof. An extension 35 is slidably received in each of the bent portions 34 and can be fixed in place by a bolt 36 so that the arms 31 are extendible. The extensions 35 can be extended and retracted relative to the respective bent portions 34 in accordance with the width of the object to be supported in the display stand. A rod 37 has one end perpendicularly fixed to the free end of each of the extensions 35 and has a head 38 formed on the other end thereof.

A link 40 has an upper end pivotally coupled to each of the bent portions 34 and has a covering sheet 41 of soft and resilient material disposed on the front surface thereof. The lower ends of the links 40 are pivotally coupled together by a member 42 to which a rod 43 is perpendicularly coupled. A head 44 is formed on the free end of the rod 43.

Figure 5:
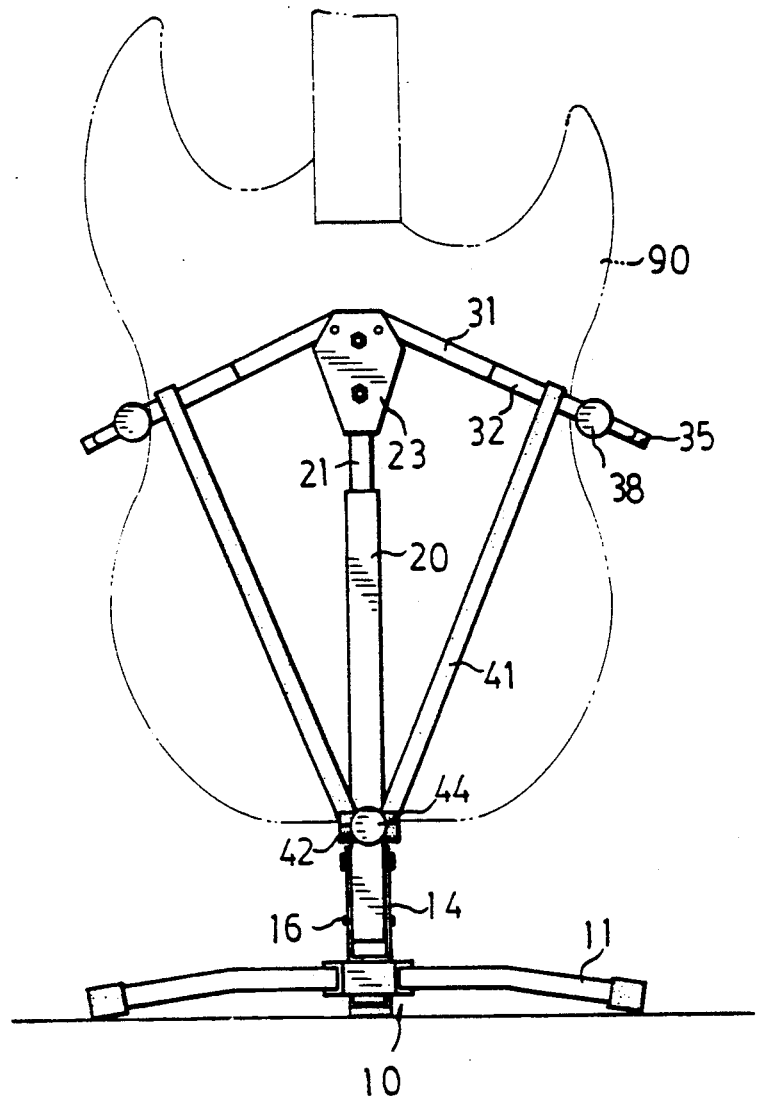
FIGS. 5, 6 and 7 are front views embodying the present invention.
Figure 6:
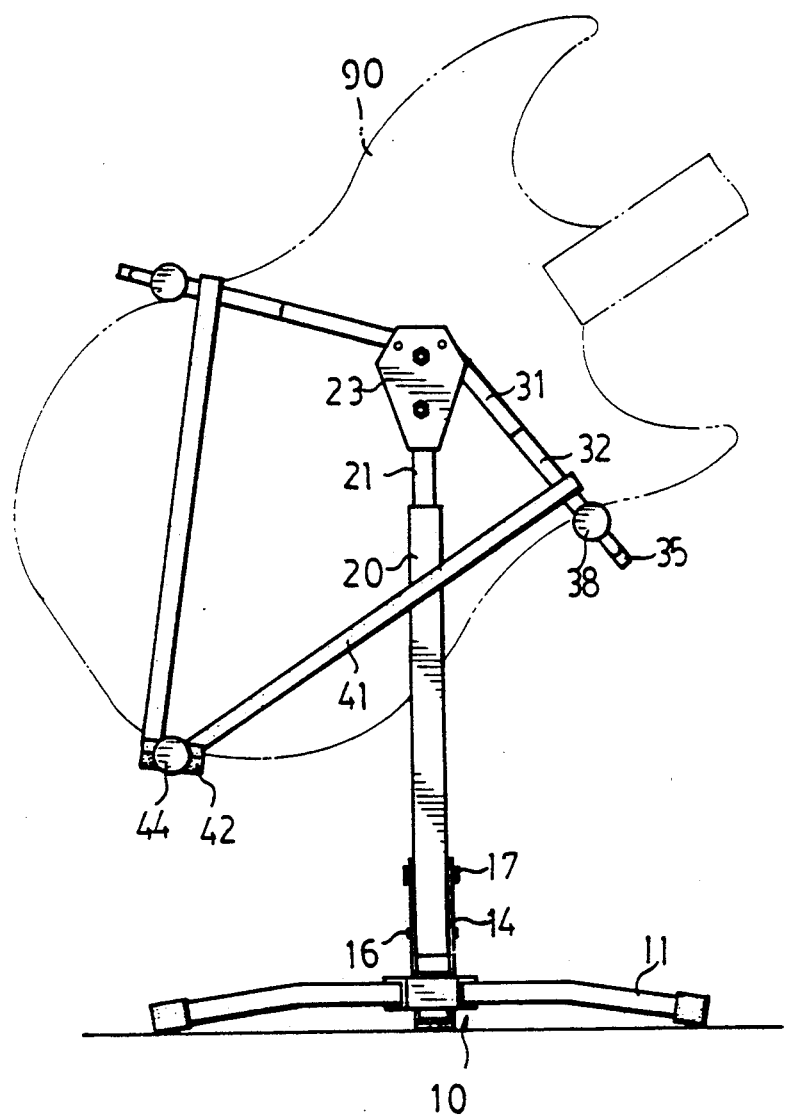
Figure 7:
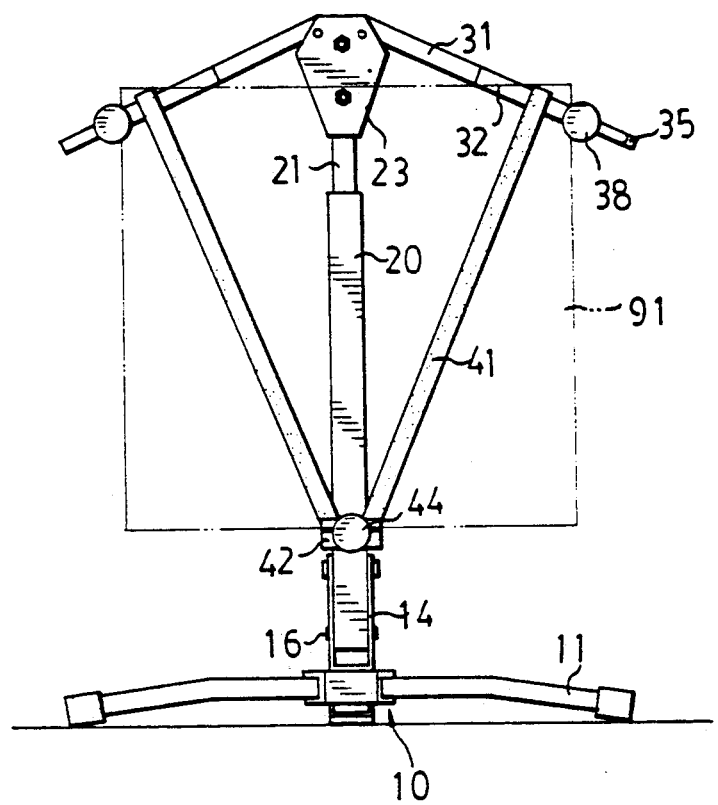

In operation, as shown in FIGS. 5 to 7, when an object 90 or 91 is disposed on the rod 43, the arms 31 will be caused to move downward by the weight of the object and the rods 37 will be caused to move inwards toward the object so that the object can be stably held in place by the rods 43 and 37. The heads 38 and 44 are provided for limiting the movement of the objects so that the objects can further be stably retained in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A display stand comprising a base, a post vertically disposed on said base, a pair of arms pivotally coupled to said post and each having an upper rod fixed to an outer end thereof, each of said arms having a bent portion formed on said outer end thereof, an extension slidably received in each of said bent portions so that said arms are extendible, each of said upper rods being perpendicularly coupled to a free end portion of a respective extension, at least two springs biasing said arms upward, a pair of links each having an upper end pivotally coupled to said outer end of a respective arm and having a lower end pivotally coupled together, a lower rod coupled to said lower end of said links, whereby said arms will be caused to rotate downward when an object is disposed on said lower rod and said upper rods will be caused to move toward said object in order to hold said object in place.

2. A display stand according to claim 1, wherein said base includes at least three legs coupled together by a coupler, a bracket is disposed on said coupler and comprises a pair of walls, said post has a lower end pivotally coupled between said walls of said bracket, a slot is formed in one of said walls, a fixing bolt extends through said slot and is threadedly engaged to said post so that said post can be fixed at a desired angle.

3. A display stand according to claim 1, wherein a bar is slidably received in said post and extendible upward beyond said post, a coupler is fixed on an upper end of said bar, and said inner ends of said arms are pivotally coupled to said coupler by said pivot axles.

4. A display stand according to claim 1, wherein each of said upper rods and said lower rod has a head formed on a free end portion thereof so as to limit a movement of said object.

5. A display stand according to claim 1, wherein each of said links has a covering sheet of soft and resilient material disposed on a surface thereof.

6. A display stand comprising a base, a post vertically disposed on said base, a pair of arms each having an inner end pivotally coupled to an upper end of said post at a pivot axle and each having a first rod perpendicularly fixed to an outer end thereof, each of said arms having a bent portion formed on said outer end thereof, an extension slidably received in each of said bent portions and extendible outward beyond said bent portions so that said arms are extendible, each of said first rods being perpendicularly coupled to a free end portion of a respective extension, a spring disposed on each of said pivot axles for biasing said arms upward, a pair of links each having an upper end pivotally coupled to said outer end of a respective arm and having a lower end pivotally coupled together, a second rod perpendicularly coupled to said lower end of said links, whereby said arms will be caused to rotate downward when an object is disposed on said second rod so that said first rods will be caused to move toward said object in order to hold said object in place.

* * * * *

UNITED STATES PATENT AND TRADEMARK OFFICE
CERTIFICATE OF CORRECTION

PATENT NO.  : 5,121,890
DATED       : June 16, 1992
INVENTOR(S) : Hitoshi KOMADA It is certified that error appears in the above-identified patent and that said Letters Patent is hereby corrected as shown below:

Column 1, line 30, change "links whereby," to --links, whereby--.

Column 2, line 10, change "preferably" to --preferable--.

Signed and Sealed this

Tenth Day of August, 1993

Attest:

MICHAEL K. KIRK

*Attesting Officer*     Acting Commissioner of Patents and Trademarks